UNITED STATES PATENT OFFICE.

ERNESTO LORENZO BELLONI, OF MILAN, ITALY.

PROCESS FOR INTEGRAL OR THROUGH COLORATION OF MARBLE.

No. 844,846.  Specification of Letters Patent.  Patented Feb. 19, 1907.

Application filed July 16, 1906. Serial No. 326,409.

*To all whom it may concern:*

Be it known that I, ERNESTO LORENZO BELLONI, a subject of the King of Italy, residing at Milan, Italy, have invented certain new and useful Improvements in Process for Integral or Through Coloration of Marble, of which the following is a specification.

Marble coloring, though known long ago, has never arisen to an industry proper, owing to the unconquered difficulty of thorough penetration of the coloring matter through the mass of the marble.

It is known that white marble, from which colored marble is obtained, is an eminently crystalline material—that is, to say, its constituent particles are not casually aggregated to each other, but arranged according to such geometrical structure plans that the whole of its mass is permeated by the capillar tubes formed by the intercrystalline spaces.

Various attempts were made to fill the said spaces with coloring substances, but most of them were unsuccessful, owing to their being no clear intelligence of the behavior of the coloring substances as to the mass of the marble to be colored. In fact, people proceeded to marble coloring exactly as if silks were to be dyed, and the only point was to study a color capable of being permanently fixed on its substratum without ascertaining whether the character of such coloring solution was adapted to allow of deep penetration inside the mass, or instead of giving the solution this strength of penetration attempts were made to overcome by mechanical external means the resistance opposed to penetration, such as the use of vacuum and pressure, to obtain an integral or through coloring.

Although marble seems to be a material easily impregnated by coloring substances, it presents very great difficulties in coloring, owing to the fact that there not being any nexus between the coloring substance and the material of the marble the said coloring substance is liable to be easily altered by atmospherical agents.

In order to obtain an unalterable coloring of marble, the latter must be, as much as possible, combined by chemical affinity with the coloring substance, whence the necessity to form the coloring pigment within the marble, so as to enable the latter to participate of the reaction when this takes place. It is therefore obvious that owing to the necessity of using different salt solutions designed to act the one after the other integral marble coloring is far from being an easy matter, as if the first salt solution easily gets access through the numerous intercrystalline spaces of the marble the subsequent ones will find the access obstructed by the residues of the first impregnation, whereby the subsequent impregnations will always be more superficial than the preceding ones, so that in the center of the mass color will be wanting. The marble, either in the form of sawed slabs or in big blocks, is to be considered as a porous wall where the intercrystalline pores represent as many capillar tubes in which for determined physical powers the coloring salt solutions act. It is proved by physical laws that a salt solution has a greater power of penetrating through a porous wall the more concentrated the said solution is.

It will be seen that the marble when not yet subjected to any coloring treatment has a number of pores in its interior to allow of the easy access of the elements of any neutral salt solution; but on repetition of this treatment, after one or more solutions having deposited their residues in the said pores, the passage will become more and more narrow, opposing an increasing resistance to the further penetration of the said elements into the depth of the marble, which resistance must be overcome by giving the subsequent solution a greater power of penetration than the preceding ones, which is obtained, as has been said, by a higher degree of concentration of the solution. This is the only means for practically obtaining integral or through coloring of marble.

By way of example, suppose white marble is to be red colored by ferrocyanid of copper. I then introduce the piece of marble into a neutral or alkaline solution of a copper salt, thus as ammoniacal copper acetate, whereupon it is left to dry and introduced again into a bath of alkaline ferrocyanid.

It is obvious that the copper salt will penetrate into the interior of the marble in consequence of evaporation of the solvent (ammoniacal liquid) and will stop in the intercrystalline spaces obstructing them more or less completely according to the quantity of solution penetrated therein and the degree of concentration of same. Now the alkaline ferrocyanid finds no more the easy access as before, as besides the resistance opposed by the marble it finds an additional resistance—namely, that opposed by the copper salt deposited in the intercrystalline spaces which tends to reduce the passage—and it is therefore necessary to give the solution a higher penetrating power to enable it to arrive where the first solution has penetrated. If the first solution, for instance, in order to arrive at a depth X needed a penetrating power equal to 1, the second solution, owing to the resistances being increased—i. e., comprising the initial resistance of marble plus that of the first solution—will need a penetrating power equal to 2 in order to arrive at the same depth X, this being a necessary condition to have all of the copper salt transformed into ferrocyanid and the coloring become uniform throughout.

My present marble-coloring process being based on the principle of the coloring solutions used being of different degree of concentration, it will be understood that the operator will be in a position to obtain any coloring effect in the marble. Thus in the above example by means of copper salt and alkaline ferrocyanid solution I am able to obtain a uniform rose color in the marble when very much diluted solutions are used and a red and blue color when so using concentrated solution that the degree of concentration of the second solution is not too much higher than that of the first one. Furthermore, inverting the use of the two solutions—that is to say, first impregnating the marble with an alkaline ferrocyanid solution and then with an ammoniacal copper solution, provided they be of progressive concentration, I will obtain an integral coloring of a fine rose green due to the complementary coloring composed of the blue of the copper salt in excess, the red of the ferrocyanid, and the white of the marble.

Of course, in order that the operator may be able to obtain different effects of shadowing and marbling he must know the chemical and physical structure of the marble to be colored, which presents in its mass differences of structure and composition which may be taken advantage of for easily obtaining marbling effects in coloring similar to those observed in natural-colored marbles, as nature in its slow process of coloring has exclusively taken advantage of them to produce the infinite variations of color found in natural marbles. It is also necessary to be able to control at will the concentration of the solutions. To obtain this, we are assisted by physics, by which we are taught that the osmotic power of a salt solution is given by the sum of the osmotic powers which the salt elements constituting the solution would exercise if each of them would act in an equal quantity of liquid. Thus, for instance, while a water solution of potassic ferrocyanid can never have a higher density than 17° Baumé at fifteen per cent. when adding to this solution sodic ferrocyanid and soluble ferrocyanids generally its density may be increased at will and the solution may be given such penetrating power as deemed necessary to obtain the effect aimed at. The fact of being able to give the salt solution at will any degree of concentration is also of great importance in integral marble-coloring, especially when applied to very thick blocks, a thing that appears to have never been provided by any one hitherto dealing with marble-coloring, and to this is due the bad success in coloring big blocks or slabs offering a great resistance to penetration. This penetrating power will be further increased by the intervention of heat by causing it to act directly on the coloring solutions and slightly heating the marble which will then give up part of its heat to the solution into which it will be immerged, thus raising its initial thermic degree. To this purpose I may, for instance, proceed as follows: The marble, in sawed slabs or big blocks, is first introduced into an air-current-drying chamber to expel all of its humidity from it, the said air-current being dried by being caused to pass through a burning-furnace, which besides drying heats it materially, whereby a sensible heating of the marble is produced, which when kept below 100° centigrade is unable of deteriorating its compactness and accelerates very much its drying. The marble when thoroughly dried, but still hot, is immerged into suitable salt solutions, which may have the temperature of the surrounding atmosphere or be slightly heated. By all means it will be necessary that the difference between the temperature of the marble and the solution be not too great, it being no very good heat-conductor, and that the total heat be not excessive, as in this case the compactness of marble would suffer. In general the rise of temperature of a few degrees above the normal one, furnished by the marble when immerged slightly heated into the solution, will be quite sufficient. When the first impregnation is completed, a new drying is necessary, which in this case will be much facilitated by the intervention of heat, and this operation will be repeated again and again until the desired color and intensity are obtained.

Having now fully described my said invention and the manner in which the same is to be performed, what I claim, and desire to secure by Letters Patent of the United States, is—

1. The herein-described process of coloring marble which consists in subjecting said marble successively to the action of salt solutions of gradually-increased osmotic power.

2. In the process of coloring marble, the step of obtaining highly-concentrated salt solutions which consists in first obtaining a saturated solution of the acid radical of the base desired and then increasing the degree of concentration of said solution by the introduction of fresh quantities of the acid radical of the said base combined with a radical different from the first-named acid radical, said radical being soluble in solvents of the first-named radical, substantially as described.

In testimony whereof I have affixed my signature in presence of two witnesses.

ERNESTO LORENZO BELLONI. [L. S.]

Witnesses:
  G. B. ZANARDO,
  ERNEST Y. SANTI.